United States Patent [19]

Appel

[11] 4,252,184
[45] Feb. 24, 1981

[54] CONTROL OF OIL DISTRIBUTION IN HEATED EMBOSSING ROLLS

[75] Inventor: David W. Appel, Wittenberg, Wis.

[73] Assignee: Kimberly-Clark Corporation, Neenah, Wis.

[21] Appl. No.: 128,408

[22] Filed: Mar. 10, 1980

[51] Int. Cl.³ ............................................ F28F 5/02
[52] U.S. Cl. ..................................... 165/90; 34/119; 34/124; 165/DIG. 26
[58] Field of Search ............. 165/90, 91, 89, DIG. 26; 34/119, 124

[56] References Cited

U.S. PATENT DOCUMENTS

| | | | |
|---|---|---|---|
| 2,677,899 | 5/1954 | Ohlson et al. | 165/89 |
| 3,838,734 | 10/1974 | Kilmartin | 165/90 |
| 4,050,510 | 9/1977 | Theysohn | 165/89 |
| 4,069,594 | 1/1978 | Feurstein | 165/90 X |
| 4,077,466 | 3/1978 | Fleissner | 165/89 |

FOREIGN PATENT DOCUMENTS 503630  4/1939  United Kingdom ..................... 165/90

*Primary Examiner*—Sheldon J. Richter
*Attorney, Agent, or Firm*—Stephen R. May; Herrick

[57] ABSTRACT

A heated roll member especially adapted to provide a uniform temperature surface for embossing or calendering low basis weight cellulose or polymeric webs. The roll member comprises outer and inner shells with an annular chamber therebetween and apertures in the inner shell which introduce fluid into or remove fluid from the annular chamber. Specially constructed apertures, each provided with a flow diverting means, produce fully turbulent flow in a heated fluid moving axially within the annular chamber. A controlled level of turbulence in the fluid is initiated at the aperture and is maintained throughout the annular chamber, such that "hot" or "cold" areas do not develop on the surface of the outer shell.

14 Claims, 4 Drawing Figures

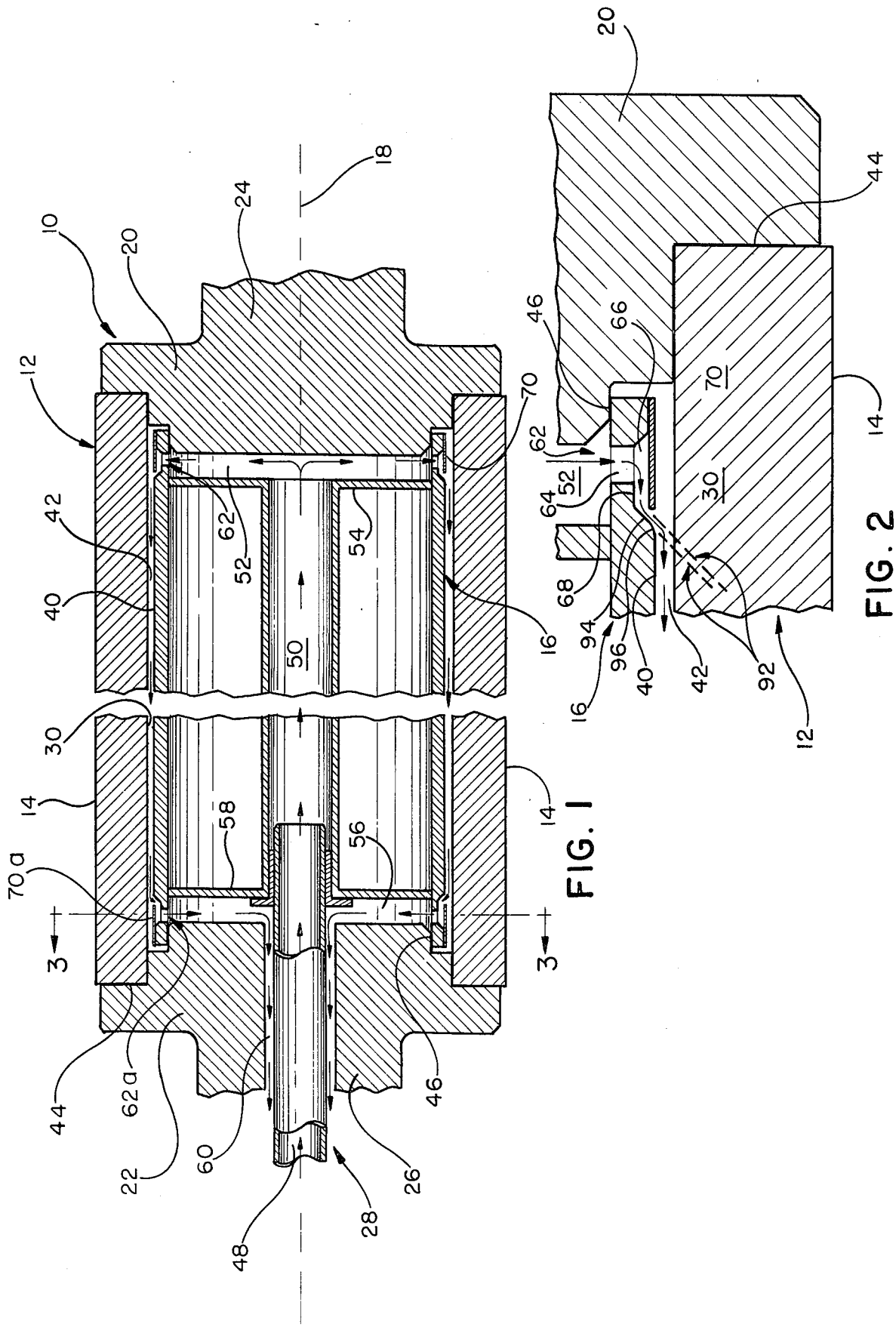

CONTROL OF OIL DISTRIBUTION IN HEATED EMBOSSING ROLLS

BACKGROUND OF THE INVENTION

The present invention relates to machine rolls for making low basis weight webs, and more specifically to a roll heated with hot oil for use in the manufacture of cellulose webs or polymeric webs or films.

One of the problem areas in providing a hot-oil heated roll, such as an embossing roll, is that with all currently available systems of which applicant is aware, localized hot or cold spots develop on the surface of the roll due to undesirable flow patterns and variable heat transfer from the hot oil, which results in nonuniform bonding patterns within the cellulose or polymeric web. One desirable method of distributing heat to the surface of the roll is by the use of an annular space between an outer and an inner roll, with the hot oil being distributed throughout this annular space between the rolls.

The ultimate purpose of using a heated fluid, such as oil, is to approach a uniform temperature over a predetermined active width of the surface of the roll where embossing or calendering is to take place. Nearly uniform temperature is important not only for proper thermal conditions in embossing or calendering, but also to maintain a controlled roll profile and resulting pressure distribution across the roll width in the nip between the rolls. Local hot spots in a roll causes local expansion and result in areas of excessive nip pressure. A nonuniform temperature, particularly from the ends of the roll to the center, alters the fit of each roll to its counterpart and areas of undesirably higher or lower compacting pressure result.

A heated roll as envisioned herein, such as an embossing roll, typically has a somewhat greater width than the width of the web to be produced so that end conditions in the roll have minimal effect on the active length of the roll nip. However, variation in the level of turbulence has been found to produce differences in heat transfer from the heating medium to the roll. Therefore, the result is nonuniform temperature in many prior art devices where the heating medium is introduced at one end of the roll so that it may move axially to the opposite end. Other prior art suggestions include introducing the oil at regularly spaced intervals over the entire width of the roll causing local areas of high turbulence. In any case, the heated oil is introduced perpendicular to the inner surface of the roll to be heated. This results in a "hot spot" in the area where the oil impinges on the inner surface of the roll with "cold spots" therebetween.

Another problem with prior art devices is that the flow rates at various points from oil entrance to oil exit are nonuniform. Oil introduced at one end of the roll tends to speed up as it moves axially toward the oil exit when oil is introduced at spaced axial intervals along the roll, since the flow rate of the total oil flow is equal to the sum of the flows from each oil inlet port.

One prior art roll-heating method is shown in U.S. Pat. No. 3,838,734, Killmartin. Although this device is intended to supply a coolant to a chill roll, it has been used as a basis for heated rolls. In this apparatus, coolant is delivered to an inner chamber within an inner shell, the inner shell being provided with nonuniform-diameter axially spaced openings from end to end constructed so that the flow rate is equalized through holes at different axial locations. Fluid is conducted axially through an annular space between the inner and outer shells in order to cool the outer surface of the outer shell.

U.S. Pat. No. 4,050,510, Theysohn illustrates a roll heating configuration wherein an outer shell has a plurality of axial passages drilled therein beneath the outer surface of the shell. An end structure is provided with a plurality of radial passageways communicating with the axial passages so that steam supplied to the radial passageways will heat the roll surface through the axial passages.

While these devices perform their intended function, that is, heating or cooling the outer roll surface, they are not capable of doing so in a totally acceptable manner. When the rolls are used in conjunction with relatively thick cellulosic or other types of webs, precision in the temperature profile across the roll width may not be necessary. However, when dealing with extremely thin or low basis weight webs, such as spunbonded or meltblown nonwoven films or webs, or tissue grade cellulose webs, it is critical that the temperature be uniform across the width in order to assure that the rolls seat properly to produce a web with uniform embossing or calendering across the roll width.

SUMMARY OF THE INVENTION

In the present invention, there is a heated roll member such as utilized in a papar machine, having coaxially-mounted outer and inner shells, defining an annular chamber between an inner surface of the outer roll and an outer surface of the inner roll. The surface of the inner roll is provided with a plurality of radially oriented apertures permitting a fluid to flow from within one end of the inner shell to the annular chamber. Each of the apertures is provided with a flow diverting means which partially overlies the aperture and deflects the fluid from flowing in a radial direction to circumferential and axial directions. Means are provided for introducing the fluid into one end of the inner shell and the annular chamber, and for removing the fluid from an opposite end of the annular chamber and the inner shell.

The apertures are aligned in a common plane perpendicular to the longitudinal axis of the inner and outer shells, with one set of apertures at one end of the inner shell being inlet apertures and a second set of apertures at the outer end of the inner shell being outlet apertures. There are circumferential grooves provided on the outer surface of the inner shell in the same planes as the apertures at each end of the shell. The apertures are drilled through the inner shell at the location of the circumferential groove.

Each aperture is provided with a flow diverting means in the form of a circumferential band affixed to the outer surface of the inner shell or as an individual means associated with each aperture. Fluid flowing from the inlet aperture strikes the flow diverting means and is diverted circumferentially in both directions, whereupon it meets circumferential flow from adjacent apertures. The interaction of the aperture and the flow diverting means produces a control orifice which has a width approximately 75% the width of the annular chamber, so that fluid flowing from the control orifice to the annular chamber will undergo a reduction in velocity.

Other features of the invention will become apparent from the following detailed description.

BRIEF DESCRIPTION OF THE DRAWINGS

FIG. 1 is a longitudinal sectional view of a heated roll of the present invention;

FIG. 2 is an enlarged partial sectional view of a portion of FIG. 1;

DETAILED DESCRIPTION OF THE PREFERRED EMBODIMENT

Figure 3:
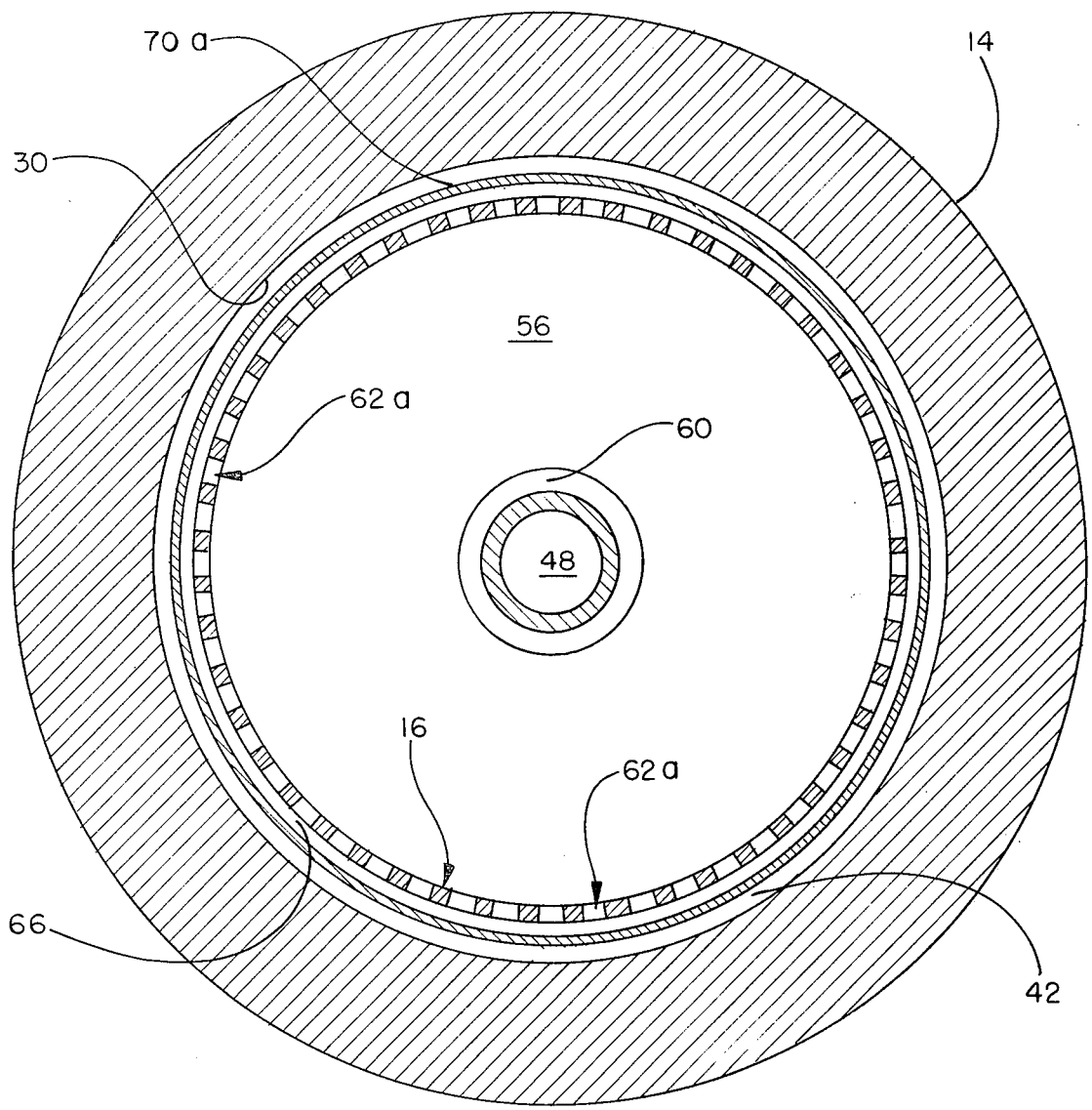
FIG. 3 is a cross sectional view taken along lines 3—3 of FIG. 1.

As shown in FIG. 1, there is a roll member generally designated at 10, being ½ of a roll couple, the other roll not being shown. Typical environments of the roll of the present invention are a steel surfaced embossing roll mating with a rubber covered roll for the embossing of a paper web, or as a hard surface calender roll mating with a similar roll for the production of polymeric films or webs. While the roll 10 of the present invention may advantageously be used in these environments, it will be understood that certain features of the invention may be utilized in other arrangements, or for other purposes (as, for cooling instead of heating). For purposes of this disclosure, the roll 10 will be described as used in an embossing operation of a polymeric web.

The roll 10 is provided with an outer shell 12 having outer embossing surface 14, and an inner shell 16, the shells 12 and 16 being coaxially mounted for rotation about longitudinal axis 18. The shells 12 and 16 are tubular members enclosed at their ends by head members 20 and 22. Each of the head members 20, 22 carry journals 24 and 26 to be supported in bearings for rotatively carrying the roll 10. At least one of the head members 20, 22 is provided with conventional drive means (not shown herein) to rotate the roll member 10 about axis 18. Oil circulation means 28 may be advantageously connected to one head member 22, while the drive means may be affixed to the other head member 20. Alternatively, one of the oil circulation means 28 (either inlet or outlet) and the drive means may be affixed to the same head member.

The outer shell 12 is provided with an inner surface 30 closely associated with an outer surface 40 of the inner shell 16. An annular chamber 42 is produced therebetween which extends the width of the roll member 10 between head members 20 and 22. The outer shell 12 is seated to the head members 20, 22 at 44, as with bolts, and the inner shell 16 is likewise affixed to the head members 20, 22 at 46. Heating fluid is supplied to the annular chamber 42 through inlet conduit 48, through an axial passageway 50 within inner shell 16, and through a radial inlet passageway 52 defined by the head member 20 and end portion 54 of inner shell 16. Fluid passing through passageway 50 impinges on head member 20 and is deflected radially in all directions within inlet passageway 52 toward the annular chamber 42 which surrounds inner shell 16.

Fluid is returned to a heating member (not shown) from annular chamber 42 through radial outlet passageway 56 defined by head member 22 and the end portion 58 of inner shell 16 opposite end portion 54. Fluid is removed from the roll member 10 through outlet conduit 60, to be reheated and reintroduced to the roll 10.

Heating fluid is directed into and out of the annular chamber 42 through apertures, here generally designated 62, which are formed through the inner shell 16 radially adjacent the passageways 52 and 56. These apertures may take any convenient form, but a configuration found to have especially good performance characteristics is described hereinafter. As shown in FIG. 2, the aperture 62 through inner shell 16 is a circular hole 64 drilled through the inner shell at the location of a circumferential groove 66 which is milled around the outer surface of shell 16. The groove 66 is preferably provided with sidewalls angled as shown in FIG. 2, with the radial axis of groove 66 offset from the radial axis of hole 64, so that oil may flow circumferentially in groove 66 between lip portion 68 and flow diverting means 70.

Flow diverting means 70 is affixed to the inner shell 16, the means 70 being in the form of a circumferential band 72 as shown in FIG. 3, or as individual means associated with each aperture 62. The apertures 62 are aligned radially about the circumference of the inner shell 16 at the location of circumferential groove 66 at each end, radially adjacent passageways 52 and 56, so that the means 70 essentially encloses groove 66.

The operation of a single pass, axial flow heated roll as in the present invention must be accomplished with a flow rate of heating fluid great enough to supply the total heat required by the roll without the fluid temperature being reduced at the outflow end by more than a predetermined allowable increment over the temperature at the inlet. As an example, for the embossing of polypropylene, up to a 6° F. differential between fluid temperatue at the inlet and outlet ends of the roll is considered acceptable.

To obtain a small but uniform gradient in temperature across the active length of the roll using the apparatus described above, constant conditions for optimal heat transfer from the heating fluid to the outer shell must be maintained. This is achieved by selecting the annular chamber gap, the fluid viscosity and the fluid velocity so that flow is well into the turbulent range in the annulus 42. If all three of these variables are essentially constant over the length of the annulus, and if flow is turbulent soon after entry, then an essentially constant coefficient of heat transfer will result for oil flowing within the annulus.

Figure 4:
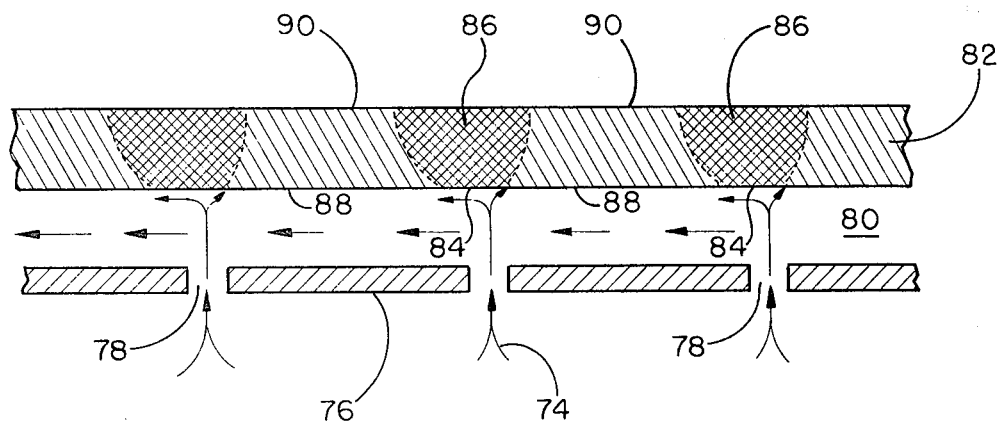
FIG. 4 is a view of a typical PRIOR ART heated roll.

Before describing specifically the operation of the present invention, it may be helpful to consider a typical prior art heated roll. As shown in FIG. 4, the heating fluid 74 is contained within the inner shell 76, from which it flows through apertures 78 to the annulus 80 between the inner shell 76 and outer shell 82. The fluid 74 flows through an aperture 78 and impinges directly upon the inner surface of the outer shell 82, as at 84, resulting in heat transfer from the fluid to the roll surface being greatest where the fluid impinges on the outer shell (indicated by crosshatching). This produces a "hot spot" 86 on the surface of the roll adjacent each point of impingement. Areas of converging flow 88 produce adjacent "cold spots" 90 on the roll surface due to their low velocity and poor heat transfer characteristics. This pattern of hot and cold spots on the roll surface has obvious deleterious effects on web embossing or calendering.

A further factor which may inhibit effective heat transfer from oil to roll surface is ineffective flow characteristics of the fluid upon entering the annulus. Optimal heat transfer will occur under fully turbulent flow, therefore the sooner this is obtained the more uniform will be the temperature profile across the roll width. Most heated rolls of which the applicant is aware have either inadequate turbulence upon entry to the heat distribution portion of the roll, or highly turbulent sites which transition toward a laminar state upon moving axially across the roll width. The former situation results in an increasing rate of heating across the roll width, and the latter results in a decreasing rate of heating or in local hot and cold zones as previously mentioned. Therefore, a roll having turbulent entry characteristics which develops and maintains uniform turbulence across the roll width is needed.

In operation, a representative roll 10 embodying the present invention may be constructed with an outer shell 12 having a 24 inch outside diameter, a 118 inch width and a 3 inch thickness. The inner shell 16 is machined to provide a uniform annular chamber 42 of 0.25 inches, a dimension large enough so that deflection of the outer shell will have no significant effect on flow within the annulus.

Aperture 62 is especially constructed to produce a desired level of turbulence in the heating fluid (oil) entering the annulus 42. A "control orifice" 92 is produced, as shown in FIG. 2, by a wall 94 of the portion 66 of aperture 62, and by flow diverting means 70. This control orifice 92 forces the oil to enter the annulus 42 at an acute angle to the outer shell 12, rather than impinging perpendicularly on the inner surface 30 of the outer shell 12. In order to produce turbulent flow, oil is provided with a design flow of 300 gallons per minute and a kinematic viscosity of $0.015 \text{ ft}^2/\text{second}$. The Reynolds' number for the annular flow therefore is 17,500, considerably in excess of the lower critical of 2,000 needed for transition to turblulent flow. Therefore, a high coefficient of heat transfer will be obtained and maintained in the annulus.

The throat of the control orifice 92 is made approximately 75% the width of the annular opening 42, producing an orifice velocity $\frac{1}{3}$ greater than the mean velocity in the annulus 42. Oil flowing through the orifice undergoes an abrupt expansion as it enters the annulus, resulting in a loss of velocity. This loss of velocity is one indicator of the energy expended in turbulence and can be related to the corresponding friction loss in the annulus per unit distance. For the roll and orifice dimensions noted above, the energy expended in turbulent agitation at the orifice is equal to the energy expended in turbulence in a 1 inch length of the annulus, an appropriate level of initial turbulence at the orifice exit to assure nearly uniform heat transfer across the annulus In order that the plurality of control orifices 92 distribute oil flowing into the annulus 42 evenly around the perimeter of the roll, oil velocity upstream from the orifice should be less than the oil velocity in the orifice, i.e., the area for flow should be larger upstream from the orifice. Therefore, for a roll with the dimensions as described above, 48 apertures 62 are provided with portion 64 having a $\frac{5}{8}$ inch diameter and the circumferential groove 66 being $\frac{1}{4}$ inch deep and having a 1 inch diameter. The passageway 50 may be provided with a 4 inch inside diameter and the passageways 52 and 56 with a flow area of 26 square inches each at the radius of the aperture 62. The first control in distributing flow uniformly results from the acceleration (and resulting pressure drop) from the inlet passageway 52 (which functions as a "stilling chamber") to the 48 apertures 64. This produces 48 equal jets of oil approximately 1.2 inches apart within the circumferential groove 66 which impinge on flow diverting means 70 rather than the inner surface 30 of outer shell 12. The flow of oil is deflected from the radial direction to both circumferential (within groove 66) and axial, assuring uniform distribution circumferentially around the annulus 42.

Oil leaves the orifice 92 with a radial component but quickly becomes an axial flow as it moves past the sharp lip of the diverting means 70. The corner 96 where flow "turns" to axial to enter the annulus 42 is preferably rounded (FIG. 2) to prevent flow separation, and causes the fluid to follow the outer surface 40 of the inner shell 16. There is essentially no impingement of oil on the inner surface 30 of the outer shell 12, therefore there will be no excessive heat transfer adjacent the aperture 62. Oil from apertures flow circumferentially within groove 66 in both directions and impinges on flow from adjacent apertures moving in the opposite direction, providing a continuous supply of oil to the control orifice where the direction of flow changes from circumferential to axial flow.

At the outlet end of the annulus, there are outlet apertures 62A equal in number and dimension to inlet apertures 62, each aperture located in a circumferential groove 66A and being provided with a flow diverting means 70A. As oil exits through the outlet apertures 62A, there is an acceleration of flow into the control orifices which serves to maintain uniform distribution of the oil within the annulus.

A heated roll as shown in FIG. 1 may be one roll of a mated couple, with the other roll being identical in all respects except the oil inlet and outlet means are reversed, so that oil flows into the roll through conduit 60, passageway 56 and apertures 62A. Axial flow is reversed and oil exits through apertures 62, passageway 52 and conduit 48. In this manner, the mated roll couple will expand equally on opposite ends for a more uniform fit.

It is to be understood that while the invention as described herein has been described as an oil heated embossing roll, there are numerous other environments in which the present invention may be properly utilized. Various other modifications and extensions of the principles of the invention will become apparent from a study of the disclosure herein provided and such alterations and extensions are contemplated as coming within the scope of the present invention as defined in the appended claims.

What is claimed is:

1. A heated roll member for use in a paper machine or the like comprising:
    (a) an outer shell having an outer surface and an inner surface, positioned for rotation about a longitudinal axis;
    (b) an inner shell having an outer surface and an inner surface, positioned within said outer roll for rotation about said longitudinal axis;
    (c) head members affixed to each of said outer and inner shells to maintain said rolls in a concentric relationship, one or both of said head members being journaled to permit rotation of said inner and outer shells about said axis;
    (d) said inner surface of said outer shell and said outer surface of said inner shell defining there-between an annular chamber of predetermined height;
    (e) a heating fluid delivery mechanism within said inner shell;
    (f) a plurality of radially oriented apertures at one end of said inner shell permitting said heating fluid to flow from said delivery mechanism to said annular chamber, said apertures being provided within a circumferential groove provided in the outer surface of said inner shell at the axial location of said apertures;

(g) flow diverting means associated with each of said apertures which partially overlie and cover each of said radially oriented apertures, and (h) a fluid exhaust mechanism at an end of said annular chamber spaced axially from said radially oriented apertures, whereby, heated fluid enters said annular chamber through said apertures at an acute angle to said outer shell.

2. The heated roll member as recited in claim 1, wherein said radially oriented apertures through said inner shell are aligned in a common plane perpendicular to said longitudinal axis such that said apertures are located on an opposite end of said inner shell from said fluid exhaust mechanism.

3. The heated roll member as recited in claim 1, wherein each of said apertures is defined by cylindrical walls aligned generally radially through said inner shell.

4. The heated roll member as recited in claim 1, wherein each of said flow diverting means affixed to said inner shell is aligned such that a control orifice is produced, said control orifice being defined by said aperture and an axially inward edge of said flow diverting means overlying said aperture.

5. The heated roll member as recited in claim 4, wherein each of said flow diverting means affixed to said inner shell is aligned such that a control orifice is produced, said control orifice being defined by an axially inwardly diverging wall of said circumferential groove and an axially inward edge of said flow diverting means overlying said aperture.

6. The heated roll member as recited in claim 5, wherein said control orifice has a width approximately 75% of the width of said annular chamber.

7. The heated roll member as recited in claim 4, wherein said fluid delivery mechanism comprises a delivery conduit of greater cross-sectional area than the sum of the areas of said control orifices.

8. The heated roll member as recited in claim 1, wherein said fluid exhaust mechanism comprises a plurality of radially oriented apertures permitting said heating fluid to flow from said annular chamber and thereafter from said heated roll member, said radially oriented apertures being provided with flow diverting means which produce a control orifice exit.

9. The heated roll member as recited in claim 8, wherein said fluid exhaust mechanism is positioned at an end of said roll member spaced axially from said fluid delivery mechanism.

10. The heated roll member as recited in claim 8, wherein said radially oriented apertures comprising said exhaust mechanism are aligned in a common plane perpendicular to said longitudinal axis.

11. The heated roll member as recited in claim 1, wherein said flow diverting means associated with each of said apertures is provided in the form of a circumferential band affixed to the outer surface of said inner shell.

12. In a roll member for use in a paper machine or the like, said roll member comprising an outer shell and an inner shell mounted for rotation about a single longitudinal axis, said inner and outer shells defining an annular chamber therebetween in fluid communication with a fluid delivery system through apertures provided in said inner shell, a method of heating said roll member comprising:

(a) affixing a flow diverting means to said inner shell such that said flow diverting means at least partially overlies and covers said apertures, said apertures being provided in a circumferential groove provided in an outer surface of said inner shell;

(b) forming a control orifice for directing fluid from said fluid delivery system to said annular chamber, said control orifice being defined by said flow diverting means and said aperture, and (c) directing a flow of heated fluid from a fluid supply system through said control orifice into said annular chamber such that said heating fluid enters said annular chamber at an acute angle to said outer shell.

13. The method as recited in claim 12, further comprising arranging said apertures on said inner shell in a common plane perpendicular to said longitudinal axis.

14. The method as recited in claim 12, wherein said roll member is mated with a second roll member such that axial flow of heated fluid in said roll member is in a direction opposite the axial flow of heated fluid in said second roll member.

* * * * *